US012775577B2

(12) United States Patent
Wu et al.

(10) Patent No.: US 12,775,577 B2
(45) Date of Patent: Oct. 27, 2026

(54) COMMUNICATIONS METHOD AND DEVICE FOR COMMUNICATIONS SYSTEM WITH A SINGLE-WIRE SERIAL BUS AND THE COMMUNICATIONS SYSTEM THEREOF

(71) Applicant: Shenzhen Shokz Co., Ltd., Shenzhen (CN)

(72) Inventors: Jiahui Wu, Shenzhen (CN); Liang Wang, Shenzhen (CN)

(73) Assignee: Shenzhen Shokz Co., Ltd., Shenzhen (CN)

( * ) Notice: Subject to any disclaimer, the term of this patent is extended or adjusted under 35 U.S.C. 154(b) by 81 days.

(21) Appl. No.: 18/895,036

(22) Filed: Sep. 24, 2024

(65) Prior Publication Data

US 2025/0013599 A1 Jan. 9, 2025

Related U.S. Application Data

(63) Continuation of application No. PCT/CN2022/128862, filed on Nov. 1, 2022.

(51) Int. Cl.
*G06F 13/42* (2006.01)
*H04R 1/10* (2026.01)

(52) U.S. Cl.
CPC .. *G06F 13/4282* (2013.01); *G06F 2213/0002* (2013.01); *H04R 1/10* (2013.01)

(58) Field of Classification Search
CPC ......... G06F 13/4282; G06F 2213/0002; H04R 1/10
See application file for complete search history.

(56) References Cited

U.S. PATENT DOCUMENTS 6,006,271 A 12/1999 Grabiec et al.
2004/0233917 A1* 11/2004 Rocas ................ H04L 25/0262
370/395.62

(Continued)

FOREIGN PATENT DOCUMENTS

CN 104794079 A 7/2015
CN 105354159 A 2/2016

(Continued)

OTHER PUBLICATIONS

International Search Report of PCT/CN2022/128860 (Feb. 25, 2024).

(Continued)

*Primary Examiner* — Eric T Oberly
(74) *Attorney, Agent, or Firm* — Fideli Law PLLC; Qiang Li

(57) ABSTRACT

A communications method, device, and system are provided. A plurality of devices in a communications system are connected via a single-wire serial bus; if a target device in the communications system needs to send target data, it is determined whether the target device has a highest data sending priority among at least one first candidate device, where the at least one first candidate device includes all devices to send data in the communications system at a current moment; and based on a result of the determining, the target device performs in a sending mode or a silent mode, where in the sending mode, the target device sends the target data to the bus within a first preset duration and specifies a receiving device, and stops sending the target data to the bus when the first preset duration ends.

17 Claims, 3 Drawing Sheets

P100

(56) References Cited

U.S. PATENT DOCUMENTS

| | | | | |
|---|---|---|---|---|
| 2012/0163429 | A1* | 6/2012 | Rinne | H02M 3/157<br>375/328 |
| 2013/0124763 | A1* | 5/2013 | Kessler | G06F 11/0754<br>710/110 |
| 2013/0215374 | A1* | 8/2013 | Blum | G05B 15/02<br>351/158 |
| 2019/0196998 | A1* | 6/2019 | Koike | G06F 13/40 |
| 2020/0366248 | A1* | 11/2020 | Ngo | H04L 67/1046 |
| 2023/0229616 | A1* | 7/2023 | Ngo | G06F 13/4072<br>710/305 |

FOREIGN PATENT DOCUMENTS

| | | | |
|---|---|---|---|
| CN | 106776436 | A | 5/2017 |
| CN | 107171921 | A | 9/2017 |
| CN | 110674065 | A | 1/2020 |
| CN | 111488307 | A | 8/2020 |
| JP | 2011151769 | A | 8/2011 |

OTHER PUBLICATIONS

Qiu, Changfeng. “Research on Several Key technologies of Networked Test System Based on RS485 Bus”, Information & Technology, China Master’s Theses Full-Text Database, Dec. 15, 2006.

* cited by examiner

COMMUNICATIONS METHOD AND DEVICE FOR COMMUNICATIONS SYSTEM WITH A SINGLE-WIRE SERIAL BUS AND THE COMMUNICATIONS SYSTEM THEREOF

RELATED APPLICATIONS

This application is a continuation application of PCT application No. PCT/CN2022/128862, filed on 2022 Nov. 1, and the content of which is incorporated herein by reference in its entirety.

TECHNICAL FIELD

This disclosure relates to the field of communications technologies, and in particular, to a communications method, device, and system.

BACKGROUND

In some communications systems, a plurality of devices need to communicate with each other based on a single-wire serial bus. The single-wire serial bus transits data in a half-duplex manner. For example, data may be transmitted from a device A to a device B, or may be transmitted from the device B to the device A, but transmission in the two directions cannot be performed simultaneously.

In the foregoing communications systems, to avoid a conflict between the plurality of devices in using the single-wire serial bus, a master device and a slave device(s) are generally specified in advance. By default, the master device always has a use right of the bus. The master device may periodically instruct, via the bus, the slave device to transmit data, and release the use right of the bus after the instruction. The slave device uses the bus for data transmission within a specified time period. After transmission of the slave device is completed or the time period expires, the master device regains the use right of the bus.

However, in the foregoing manner, the slave device is controlled by the master device, and cannot independently transmit data by using the bus.

BRIEF SUMMARY

This disclosure provides a communications method, device and system, so that all devices in a communications system can independently use a bus through competition to transmit data.

According to a first aspect, this disclosure provides a communications method for a target device in a communications system with a single-wire serial bus, including: accessing the single-wire serial bus in the communications system, where the communications system includes a plurality of devices connected via the bus, no master device is set in the communications system, and the plurality of devices is configured to obtain a use right of the bus by competition; determining whether the target device has a highest data sending priority among at least one first candidate device, where the at least one first candidate device includes all devices to send data in the communications system at a current moment; and executing, based on a result of the determining, a sending mode or a silent mode of the target device, where in the sending mode, the target device sends target data to the bus within a first preset duration and specifies a receiving device, and stops sending the target data to the bus when the first preset duration ends, and in the silent mode, the target device is in a data receiving state or an idle state within the first preset duration.

According to a second aspect, this disclosure further provides a device for accessing a communications system with a single-wire serial bus, comprising: at least one storage medium, storing at least one set of instructions and configured to communicate with another device; and at least one processor communicatively connected to the at least one storage medium, where during operation, the at least one processor executes the at least one set of instructions to cause the device to: access the single-wire serial bus in the communications system, where the communications system includes a plurality of devices connected via the bus, no master device is set in the communications system, and the plurality of devices is configured to obtain a use right of the bus by competition, determine whether the target device has a highest data sending priority among at least one first candidate device, where the at least one first candidate device includes all devices to send data in the communications system at a current moment, and execute, based on a result of the determining, a sending mode or a silent mode of the target device, where in the sending mode, the target device sends target data to the bus within a first preset duration and specifies a receiving device, and stops sending the target data to the bus when the first preset duration ends, and in the silent mode, the target device is in a data receiving state or an idle state within the first preset duration.

According to a third aspect, this disclosure further provides a communications system, comprising: a single-wire serial bus, and a plurality of devices connected to the bus, where no master device is set in the communications system, and the plurality of devices obtain a use right of the bus by competition, and when the communications system is in operation, a target device of the plurality of devices executes the following steps: accessing the single-wire serial bus in the communications system, where the communications system includes a plurality of devices connected via the bus, no master device is set in the communications system, and the plurality of devices is configured to obtain a use right of the bus by competition; determining whether the target device has a highest data sending priority among at least one first candidate device, where the at least one first candidate device includes all devices to send data in the communications system at a current moment; and executing, based on a result of the determining, a sending mode or a silent mode of the target device, where in the sending mode, the target device sends target data to the bus within a first preset duration and specifies a receiving device, and stops sending the target data to the bus when the first preset duration ends, and in the silent mode, the target device is in a data receiving state or an idle state within the first preset duration.

It can be learned from the foregoing technical solutions that, according to the communications method, device, and system provided in this disclosure, any target device in a communications system has access to a single-wire serial bus; if the target device needs to send target data, it is determined whether the target device has a highest data sending priority among at least one first candidate device, where the at least one first candidate device includes all devices to send data in the communications system at a current moment; and based on a result of the determining, the target device performs in a sending mode or a silent mode, where in the sending mode, the target device sends the target data to the bus and specifies a receiving device within a first preset duration, and stops sending the target data to the bus when the first preset duration ends, and in the silent mode, the target device is in a data receiving state or an idle state within the first preset duration. It can be learned that devices in the communications system may obtain a use right of the bus by competition, so that the devices can independently use the bus to transmit data. Further, since the devices in the communications system can independently use the bus to transmit data without relying on the control by another device, the devices in the communications system can update data in real time. In addition, a master device does not need to be set in the communications system, so that any device in the communications system does not need to periodically control another device, thereby reducing control overheads of the device and improving device performance. In addition, a priority of sending data by each first candidate device is determined, so that a first candidate device with a highest priority currently obtains the use right of the bus in each communication period. In this way, it is ensured that communication between the devices in the communications system does not conflict, and communication reliability of the communications system is improved. In addition, real-time data update of a device with a high priority can be ensured.

Other functions of the communications method, device, and system provided in this disclosure are listed in the following descriptions. Creative aspects of the communications method, device, and system provided in this disclosure may be fully explained by practice or by using the method, apparatus, and combinations described in the following detailed examples.

BRIEF DESCRIPTION OF THE DRAWINGS

To describe the technical solutions in the embodiments of this disclosure more clearly, the following briefly describes the accompanying drawings for the embodiments. Apparently, the accompanying drawings in the following description show merely some exemplary embodiments of this disclosure, and a person of ordinary skill in the art may derive other drawings from these accompanying drawings without creative efforts.

DETAILED DESCRIPTION

Figure 1:
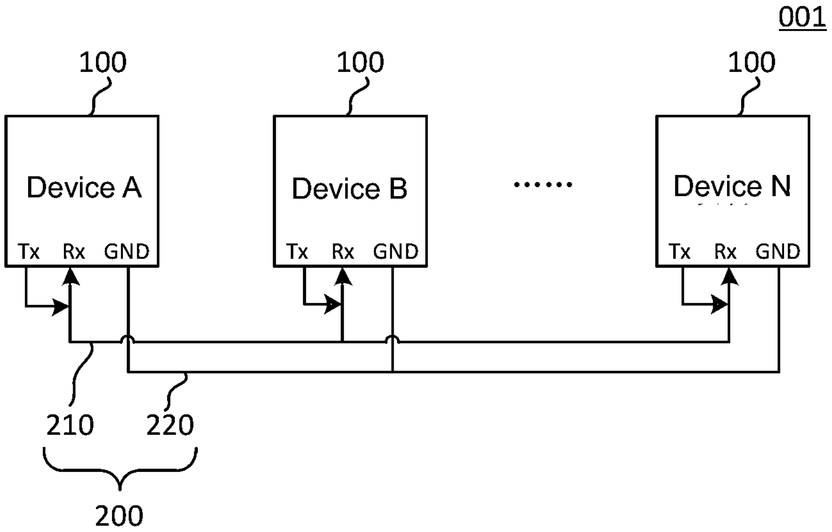
FIG. 1 is a schematic diagram of a communications system according to some exemplary embodiments of this disclosure.

The following description provides specific disclosure scenarios and requirements of this disclosure, with the purpose of enabling a person skilled in the art to make and use the content in this disclosure. For a person skilled in the art, various partial modifications to the disclosed embodiments are obvious, and without departing from the spirit and scope of this disclosure, the general principles defined herein can be applied to other embodiments and disclosure. Therefore, the specification is not limited to the embodiments, but is the consistent with the widest scope of claims.

The terms used herein are merely intended to describe specific examples or embodiments, rather than to limit the present disclosure. For example, unless expressly stated otherwise, the singular forms "a", "an" and "this" used herein may also include plural forms. In this disclosure, the terms "include" and/or "comprise" refer to the existence of an associated integer, step, operation, element, component and/or group, without excluding the existence of one or more other features, integers, steps, operations, elements, components and/or groups. In other words, other features, integers, steps, operations, elements, components and/or groups may be added to the system/method.

In consideration of the following description, in the present disclosure, these and other features, the operation and function of related elements of the structure, as well as the economics of the combination and manufacturing of components can be significantly improved. With reference to the drawings, all of these form part of the present disclosure. However, it should be clearly understood that the drawings are merely intended for illustration and description purposes, rather than to limit the scope of the present disclosure. It should be understood that the accompanying drawings are not drawn to scale.

The flowchart used in this disclosure illustrates the operations implemented by the system according to some exemplary embodiments in this disclosure. It should be clearly understood that the operations of the flowchart may be implemented out of sequence. Instead, operations may be implemented in reverse sequence or simultaneously. In addition, one or more other operations may be added to the flowchart. One or more operations may be removed from the flowchart.

For ease of description, the following terms are explained as follows in this disclosure:

Serial communication: Generally speaking, computer communication may be divided into serial communication and parallel communication. In serial communication, only one bit of signal can be transmitted at a same moment. In parallel communication, a plurality of bits of signals can be transmitted at a same moment.

Serial bus: A bus based on serial communication is referred to as a serial bus. A plurality of devices may access the serial bus and communicate with each other by using the serial bus. For example, a device A may send first data to the serial bus, so that a device B receives the first data from the serial bus. Alternatively, the device B sends second data to the serial bus, so that the device A receives the second data from the serial bus.

Serial buses can be classified into a single-wire serial bus and a dual-wire serial bus. Single-wire and dual-wire mean a quantity of signal cables in the serial bus. The single-wire serial bus includes one signal cable. A device that has access to the single-wire serial bus may send data to the signal cable, or may receive data from the signal cable, but cannot simultaneously send data and receive data at the same time. The dual-wire serial bus includes two signal cables: a transmit (Tx) signal cable and a receive (Rx) signal cable. A device that has access to the dual-wire serial bus may send data to the transmit signal cable and receive data from the receive signal cable, and may simultaneously send data and receive data without affecting each other. In some cases, in addition to a signal cable, the serial bus may further include a clock cable, a ground cable, and the like. The clock cable is used to provide a clock signal for a device, and the ground cable is used to ground the device.

Simplex, half-duplex, and full-duplex describe data transmission modes. Simplex means that data can only be transmitted in one direction. For example, the device A may transmit data to the device B, but the device B cannot transmit data to the device A. Half-duplex means that data can be transmitted in two directions, but cannot be simultaneously transmitted. For example, the device A may transmit data to the device B at a first moment, and the device B may transmit data to the device A at a second moment, where the second moment is different from the first moment. Full duplex means that data can be simultaneously transmitted in two directions. For example, the device A may transmit data to the device B, and meanwhile, the device B may transmit data to the device A. It can be understood that a data transmission mode based on a single-wire serial bus is a half-duplex mode, and a data transmission mode based on a dual-wire serial bus is a full-duplex mode.

Before specific embodiments of this disclosure are described, an disclosure scenario of this disclosure is first described. This disclosure relates to a communications system based on a single-wire serial bus. The communications system may be a wireless headphone communications system, or may be another communications system. Taking the wireless headphone communications system as an example, the wireless headphone communications system generally includes a left headphone, a right headphone, and a headphone case. If headphones are not used, a user may put the left headphone and the right headphone into the headphone case for storage, or if the headphones need to be charged, a user may put the left headphone and the right headphone into the headphone case for charging. Generally, contacts may be reserved for the left headphone and the right headphone, and correspondingly, contacts may also be reserved at corresponding locations on the headphone case. In this way, when the left headphone and the right headphone are placed in the headphone case, contacts on the left headphone and the right headphone are in contact with the contacts on the headphone case, so that charging or other data interaction can be performed. These contacts are connected via the single-wire serial bus, so that communication between the left headphone, the right headphone, and the headphone case can be performed based on the single-wire serial bus.

It should be noted that the foregoing wireless headphone communications system is only one of a plurality of usage scenarios provided in this disclosure. The communications method provided in this disclosure may be applied not only to the wireless headphone communications system, but also to all scenarios in which communication is performed based on a single-wire serial bus. A person skilled in the art should understand that the communications method in this disclosure is also within the protection scope of this disclosure when being applied to other usage scenarios.

In the related art, in the communications system based on a single-wire serial bus, to avoid a conflict between a plurality of devices using the bus, a master device and a slave device are typically specified in advance. By default, the master device always has a use right of the bus. The master device may periodically instruct, via the bus, the slave device to transmit data, and release the use right of the bus after the instruction. The slave device uses the bus for data transmission within a specified time period. After transmission of the slave device is completed or the time period expires, the master device regains the use right of the bus. In this manner, data transmission of the slave device is controlled by the master device, and data cannot be independently transmitted. Further, since the master device needs to periodically instruct the slave device to transmit data, it is difficult to balance real-time performance of data update of the slave device and system overheads of the master device. For example, if a period in which the master device instructs the slave device to transmit data is too long, the real-time performance of data update of the slave device is relatively low. If a period in which the master device instructs the slave device to transmit data is too short, system overheads of the master device are relatively high. In addition, the foregoing communication mode is generally applicable to only a communications system that includes two devices.

To resolve at least one of the foregoing technical problems, the embodiments of this disclosure provide a communications method, device, and system. The following first describes a communications system with reference to FIG. 1.

FIG. 1 is a schematic diagram of a communications system according to some exemplary embodiments of this disclosure. As shown in FIG. 1, a communications system 001 may include a single-wire serial bus 200 (hereinafter referred to as a bus 200) and a plurality of devices 100 connected via the bus 200, for example, a device A, a device B, and . . . , and a device N. The plurality of devices 100 may communicate with each other by using the bus 200.

The bus 200 includes one signal cable 210. Referring to FIG. 1, each device 100 has a transmit (Tx) port and a receive (Rx) port. Both the transmitting port and the receiving port are connected to the signal cable 210, so that different devices can transmit data based on the signal cable 210. As the bus 200 is a single-wire serial bus, a data transmission mode between different devices is a half-duplex mode. In some exemplary embodiments, the bus 200 may further include a ground cable 220. Each device 100 may further have a ground port (GND), and the ground port is connected to the ground cable 220, so that a common ground connection is implemented between different devices. In this way, interference of an external signal can be reduced. In some exemplary embodiments, the bus 200 may further include a clock cable (not shown in FIG. 1). Each device may further have a clock interface (not shown in FIG. 1), and the clock interface is connected to the clock cable, so that clock synchronization is implemented between different devices.

The device 100 is an electronic device that may perform communication based on a single-wire serial bus. No master device is set between the plurality of devices 100 in the communications system 001, or there is no master-slave relationship between the plurality of devices 100 in the communications system 001. The plurality of devices 100 in the communications system 001 obtain a use right of the bus by competition 200.

In some exemplary embodiments, the foregoing competition may be as follows: A device that is to send data in the communications system at a current moment is referred to as a first candidate device. If there is only one first candidate device in the communications system, the first candidate device may obtain the use right of the bus 200. It is assumed that there are a plurality of first candidate devices in the communications system at the moment, and based on a priority of sending data by the plurality of first candidate devices, a first candidate device corresponding to a highest priority obtains the use right of the bus 200. The foregoing competition manner is applicable to all devices in the communications system 001. The foregoing "obtaining a use right of the bus 200" refers to obtaining a use right of the signal cable 210 in the bus 200 to transmit data. After the device 100 obtains the use right of the bus 200, the device 100 may send target data to the bus 200, so that another device receives the target data by using the bus 200. It should be understood that at each moment, at most one device 100 in the communications system 001 obtains the use right of the bus 200. In this way, different devices 100 in the communications system 001 can compete with each other. In some exemplary embodiments, when all devices 100 in the communications system 001 do not need to send data, no device 100 has the use right of the bus 200, that is, the bus 200 is in an idle state.

In some exemplary embodiments, the communications method in this disclosure may be performed by the device 100. In this case, the device 100 may store data or an instruction for performing the communications method in this disclosure, and may execute or be configured to execute the data or the instruction. In some exemplary embodiments, the device 100 may include a hardware device having a data information processing function and a program necessary to drive the hardware device to work. The foregoing communications method is described in detail below.

In some exemplary embodiments, the device 100 may include a mobile device, a tablet computer, a laptop computer, a built-in device of a motor vehicle or the like, or any combination thereof. In some exemplary embodiments, the mobile device may include a smart home device, an intelligent mobile device, a virtual reality device, an augmented reality device or the like, or any combination thereof. In some exemplary embodiments, the smart home device may include a smart TV, a desktop computer, or any combination thereof. In some exemplary embodiments, the smart mobile device may include a smartphone, a personal digital assistance, a game device, a navigation device, or any combination thereof. In some exemplary embodiments, the virtual reality device or the augmented reality device may include a virtual reality helmet, virtual reality glasses, a virtual reality handle, an augmented reality helmet, augmented reality glasses, an augmented reality handle or the like, or any combination thereof. For example, the virtual reality device or the augmented reality device may include Google glasses, a head-mounted display, VR, and the like. In some exemplary embodiments, the built-in device in the motor vehicle may include an on-board computer, an on-board television, and the like. In some exemplary embodiments, the plurality of devices 100 in FIG. 1 may include at least two of a left headphone, a right headphone, and a headphone case.

It should be understood that a quantity of devices 100 in FIG. 1 is merely an example. Depending on implementation needs, any quantity of devices 100 may be possible. In addition, it should be noted that the communications method in this disclosure may be performed by any device 100 in the communications system.

Figure 2:
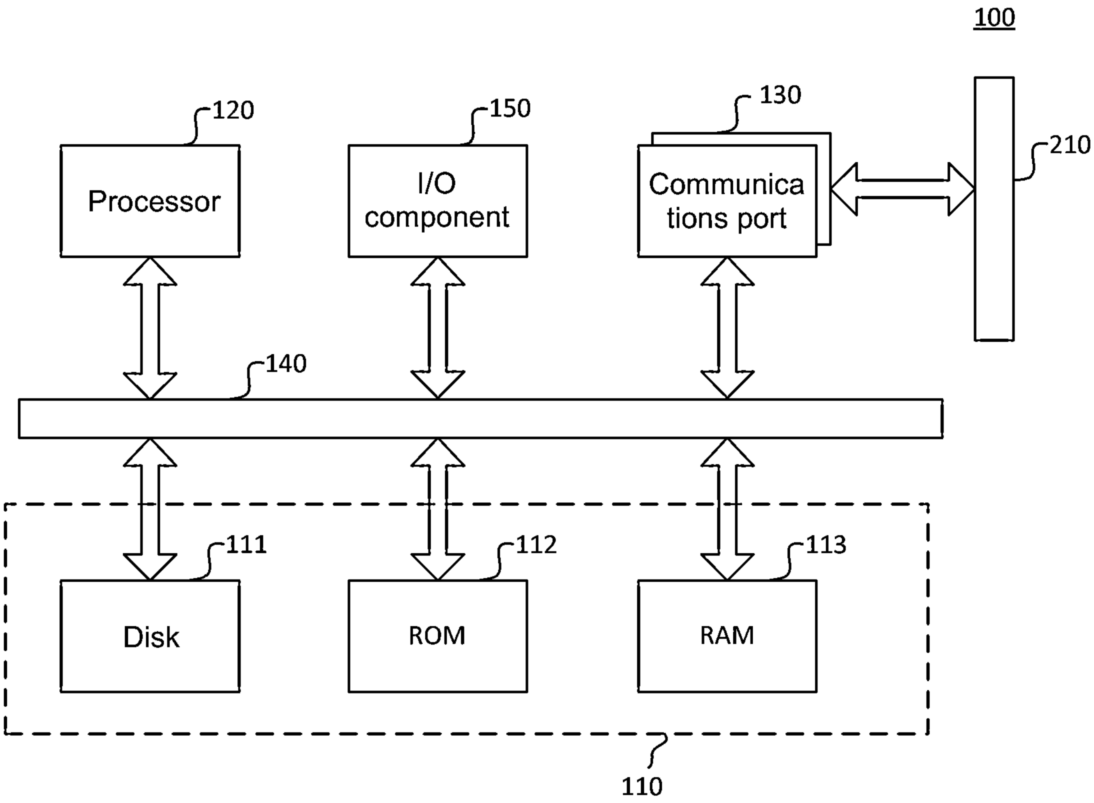
FIG. 2 is a structural diagram of hardware of a device according to some exemplary embodiments of this disclosure.

FIG. 2 is a structural diagram of hardware of a device 100 according to some exemplary embodiments of this disclosure. The device 100 may perform the communications method in this disclosure. The communications method is also described in this disclosure.

As shown in FIG. 2, the device 100 may include at least one storage medium 110 and at least one processor 120. In some exemplary embodiments, the device 100 may further include a communications port 130 and an internal communications bus 140. In some exemplary embodiments, the device 100 may further include an I/O component 150.

The internal communications bus 140 may be connected to different system components, including the storage medium 110, the processor 120, the I/O component 150, and the communications port 130.

The I/O component 150 supports input/output between the device 100 and other components.

The communications port 130 is used by the device 100 to communicate with the outside world. For example, the communications port 130 may be configured to perform data communication between the device 100 and another device. As shown in FIG. 2, the communications port 130 may include a transmitting port and a receiving port, and both the transmitting port and the receiving port are connected to the signal cable 210, to implement data communication between the device 100 and another device.

The storage medium 110 may include a data storage apparatus. The data storage apparatus may be a non-temporary storage medium, or may be a temporary storage medium. For example, the data storage apparatus may include one or more of a disk 111, a read-only storage medium (ROM) 112, or a random access storage medium (RAM) 113. The storage medium 110 further includes at least one set of instructions stored in the data storage apparatus. The instruction set includes an instruction, the instruction may be a computer program code, and the computer program code may include a program, a routine, an object, a component, a data structure, a process, a module, and the like for performing the communications method provided in this disclosure.

The at least one processor 120 may be communicatively connected to the at least one storage medium 110 via the internal communications bus 140. The at least one processor 120 is configured to execute the foregoing at least one set of instructions. When the device 100 is running, the at least one processor 120 reads the at least one set of instructions and performs the communications method provided in this disclosure according to an instruction of the at least one set of instructions. The processor 120 may perform all or a part of the steps included in the communications method. The processor 120 may be one or more processors. In some exemplary embodiments, the processor 120 may include one or more hardware processors, such as a microcontroller, a microprocessor, a reduced instruction set computer (RISC), an disclosure specific integrated circuit (ASIC), an disclosure specific instruction set processor (ASIP), a central processing unit (CPU), a graphics processing unit (GPU), a physical processing unit (PPU), a microcontroller unit, a digital signal processor (DSP), a field programmable gate array (FPGA), an advanced RISC machine (ARM), a programmable logic device (PLD), any circuit or processor capable of performing one or more functions, or any combination thereof. For illustration only, the device 100 shown in FIG. 2 includes only one processor 120. However, it should be noted that the device 100 in this disclosure may include a plurality of processors. Therefore, operations and/or method steps disclosed in this disclosure may be performed by one processor as described in this disclosure, or may be performed jointly by a plurality of processors. For example, if the processor 120 of the device 100 performs step A and step B in this disclosure, it should be understood that step A and step B may also be performed jointly or separately by two different processors 120 (for example, a first processor performs step A, a second processor performs step B, or a first processor and a second processor jointly perform step A and step B).

Figure 3:
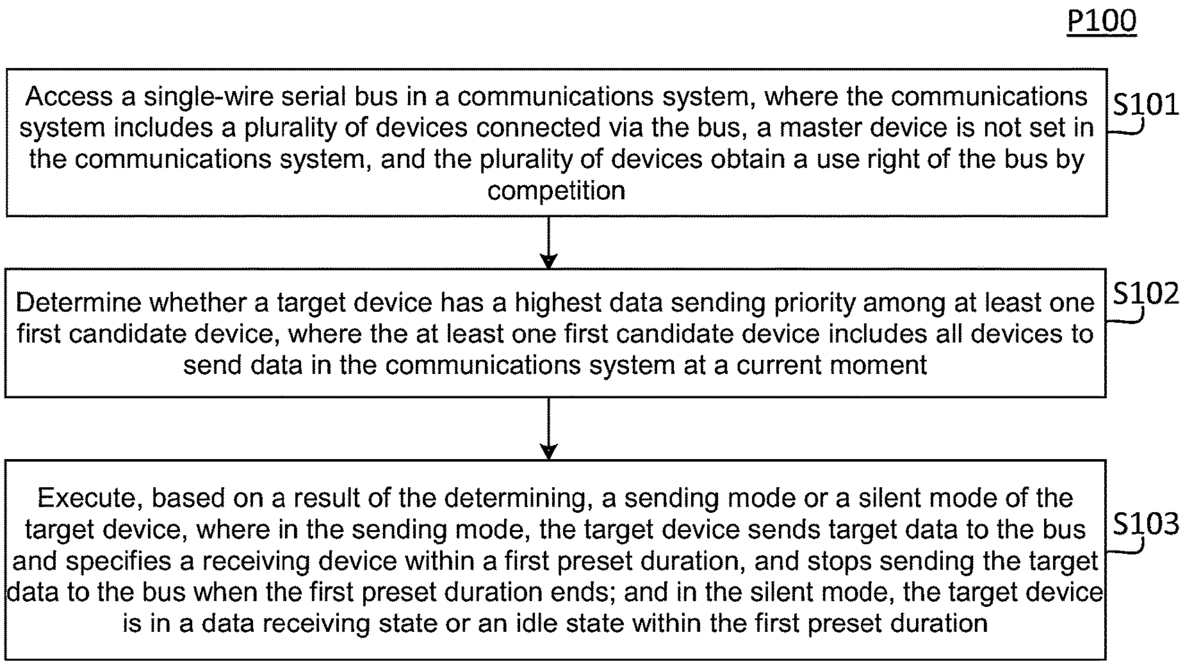
FIG. 3 is a schematic flowchart of a communications method according to some exemplary embodiments of this disclosure.

FIG. 3 is a schematic flowchart of a communications method P100 according to some exemplary embodiments of this disclosure. A target device may perform the communications method P100 in this disclosure. The target device may be any device 100 in the communications system 001. Specifically, the processor 120 in the target device may read a set of instructions stored in a local storage medium thereof, and then perform the communications method P100 described in this disclosure according to the instruction set. As shown in FIG. 3, the method P100 may include the following steps:

S101: Access a single-wire serial bus in a communications system, where the communications system includes a plurality of devices connected via the bus, a master device is not set in the communications system, and the plurality of devices obtain a use right of the bus by competition.

Specifically, a communications interface 130 of the target device may be connected to the bus 200 to access the communications system 001. In an example, the bus 200 is disposed in a headphone case, and several contacts are reserved on the bus 200. One of the contacts on the bus is connected to a communications port of the headphone case, so that the headphone case has access to the communications system. Correspondingly, contacts (corresponding to the communications port 130) are also reserved on a left headphone and a right headphone. When a user places the left headphone in the headphone case, a contact on the left headphone is in contact with a contact on the bus, so that the left headphone has access to the communications system. When the user places the right headphone in the headphone case, a contact on the right headphone is in contact with a contact on the bus, so that the right headphone has access to the communications system. In this way, the communications system includes three devices: the left headphone, the right headphone, and the headphone case. The foregoing three devices are connected via the bus 200, and perform communication based on the bus 200.

It should be noted that a master device is not set in the communications system 001 in this disclosure. In other words, there is no master-slave relationship between the plurality of devices in the communications system 001. The plurality of devices in the communications system 001 obtain the use right of the bus 200 by competition. In a time period, through competition, at most one device obtains the use right of the bus 200. In some exemplary embodiments, after each device has access to the bus 200, the use right of the bus 200 is not occupied by default, and the use right of the bus 200 may be obtained by competition against other devices when necessary. In some exemplary embodiments, there may be some moments (for example, when no device needs to send data), no device in the communications system 001 has the use right for the bus 200, that is, the bus 200 is in an idle state.

S102: Determine whether the target device has a highest data sending priority among at least one first candidate device, where the at least one first candidate device includes all devices to send data in the communications system at a current moment.

Specifically, after the target device accesses the bus 200, if the target device needs to send data, the target device needs to compete against another device(s) that needs to send data in the communications system, in order to determine whether the target device can obtain the use right of the bus 200. A specific competition manner is as follows: It is determined whether the target device has the highest data sending priority among the at least one first candidate device. If yes, the target device obtains the use right of the bus 200; if no, the target device cannot obtain the use right of the bus 200. The foregoing first candidate device is a device to send data at the current moment, or a device that needs to send data at the current moment.

It should be understood that when the target device performs S102, another first candidate device synchronously performs S102, that is, each first candidate device determines whether itself as the first candidate device has the highest data sending priority among the at least one first candidate device. In this way, for the at least one first candidate device, a first candidate device with the highest priority obtains the use right of the bus 200 by competition. For example, it is assumed that there are three first candidate devices in the communications system 001 at the current moment: a device A, a device B, and a device C. If the device A has the highest priority among the three first candidate devices, the device A obtains the use right of the bus 200. If the device B has the highest priority among the three first candidate devices, the device B obtains the use right of the bus 200. If the device C has the highest priority among the three first candidate devices, the device C obtains the use right of the bus 200.

In some exemplary embodiments, a priority corresponding to each device in the communications system 001 is a preset fixed priority, and different devices correspond to different priorities. Specifically, a fixed priority may be allocated to each device in the communications system 001 in advance. For example, a priority of the device A is high, a priority of the device B is medium, and a priority of the device C is low. It is assumed that, at a first moment, both the device A and the device B need to send data, and based on the foregoing priorities, the device A obtains the use right of the bus 200. It is assumed that, at a second moment, both the device B and the device C need to send data, and based on the foregoing priorities, the device B obtains the use right of the bus 200. A priority is allocated to each device, so that a device with a higher priority can obtain the use right of the bus 200 in a competition process, thereby ensuring that data of the device with the higher priority can be sent in a timely manner.

In some exemplary embodiments, the priority corresponding to each device in the communications system 001 is related to the data currently to be sent by the device. That is, the priority corresponding to each device is not a preset fixed priority, but is dynamically adjusted based on current to-be-sent data. A priority is dynamically adjusted, so that different devices can more equitably obtain the user right of the bus 200. In some exemplary embodiments, the priority corresponding to each device is related to a data amount of the current to-be-sent data. For example, if an amount of data to be sent by a device is larger, a priority corresponding to the device is lower. If an amount of data to be sent by a device is smaller, a priority corresponding to the device is higher. In this way, the problem that data cannot be sent since certain some devices always cannot win the use right of the bus 200 in the competition can be avoided. In some exemplary embodiments, the priority corresponding to each device is related to the importance of the current to-be-sent data. For example, if the importance of data to be sent by a device is higher, a priority corresponding to the device is higher. If importance of data to be sent by a device is lower, a priority corresponding to the device is lower. In this way, it can be ensured that data with a high degree of importance is sent.

S103. Execute, based on a result of the determining, a sending mode or a silent mode of the target device, where in the sending mode, the target device sends target data to the bus and specifies a receiving device within a first preset duration, and stops sending the target data to the bus when the first preset duration ends; and in the silent mode, the target device is in a data receiving state or an idle state within the first preset duration.

It should be understood that, in S102, it is determined whether the target device has the highest data sending priority among the at least one first candidate device, the obtained result of the determining includes two cases: (1) the target device has the highest data sending priority among the at least one first candidate device, and (2) the target device does not have the highest data sending priority among the at least one first candidate device. Therefore, the target device may choose, based on the result of the determining, to execute the sending mode or the silent mode. The sending mode may be understood as a mode of sending data to the bus, the silent mode may be understood as a mode that forbids sending data to the bus, and the silent mode may also be referred to as a disable mode.

In some exemplary embodiments, if the result of the determining is the case (1), that is, the target device has the highest data sending priority among the at least one first candidate device, it indicates that the target device can obtain the use right of the bus 200. Therefore, the target device may choose to execute the sending mode, that is, the target device sends the target data to the bus 200 within the first preset duration and specifies the receiving device, and stops sending the target data to the bus 200 when the first preset duration ends. It should be understood that the foregoing "stop sending the target data to the bus 200" may be understood as releasing the use right of the bus 200 by the target device. That is, after the target device obtains the use right of the bus 200, a validity period of the use right is the first preset duration.

In some exemplary embodiments, when sending the target data to the bus 200 within the first preset duration, the target device may send the target data in a broadcast manner. In this manner, the specified receiving device includes all devices in the communications system. In some exemplary embodiments, when sending the target data to the bus 200 within the first preset duration, the target device may send the target data in a manner of on demand. In this manner, the specified receiving device may include certain device(s) in the communications system. In some exemplary embodiments, when the target device sends the target data to the bus, a manner of specifying the receiving device may be as follows: The target device includes an identifier of the receiving device. In some exemplary embodiments, the receiving device is in a data receiving state within the first preset duration, that is, receives the target data from the bus.

In some exemplary embodiments, if the result of the determining is the case (2), that is, the target device does not have the highest data sending priority among the at least one first candidate device, it indicates that the target device cannot obtain the use right of the bus 200. In this case, the use right of the bus 200 is obtained by the first candidate device with the highest priority. The target device may execute the silent mode, that is, the target device is in the data receiving state or the idle state within the first preset duration. The data receiving state is receiving, from the bus 200, data sent by the first candidate device with the highest priority. The idle state is a state in which no data is received or sent. In some exemplary embodiments, in the silent mode, the target device may be in the data receiving state in all time periods of the first preset duration, or the target device may be in the idle state during the entire first preset duration, or the target device may be in the data receiving state in a first part of the first preset duration, and in the idle state in a second part of the first preset duration.

Figure 4:
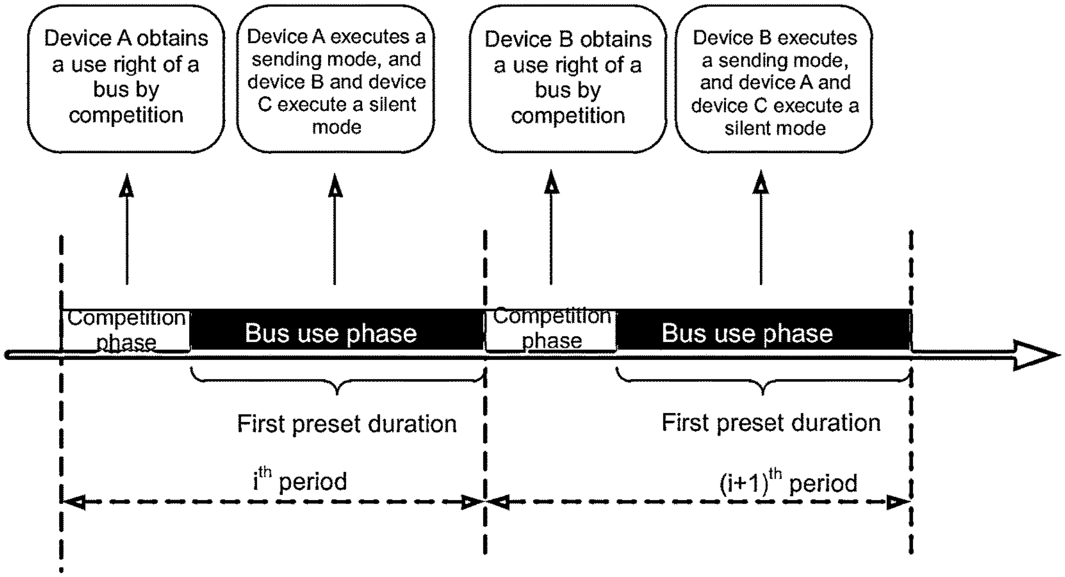
FIG. 4 is a schematic diagram of a communication process according to some exemplary embodiments of this disclosure.

For ease of understanding, the following uses FIG. 4 as an example to describe a competition-based communication mode provided in this disclosure.

FIG. 4 is a schematic diagram of a communication process according to some exemplary embodiments of this disclosure. As shown in FIG. 4, a time dimension is divided into a plurality of communication periods. In FIG. 4, two periods: an ith period and an (i+1)th period are shown. Duration of different periods may be the same or different. This is not limited in this disclosure. Still referring to FIG. 4, each period includes a competition phase and a bus use phase. In the competition phase, a device that obtains the use right of the bus 200 may be determined by competition. In the bus use phase, the device that obtains the use right of the bus 200 may send data within the first preset duration.

The following uses an example in which the communications system includes three devices: a device A, a device B, and a device C, for further description. In the ith period, it is assumed that the device A, the device B, and the device C all need to send data. In a competition phase of the ith period, the device A, the device B, and the device C each synchronously perform S102 by the foregoing communications method, that is, determine if the device has a highest data sending priority among the three devices (that is, the device A, the device B, and the device C), and a result of the determining is yes or no. Assuming that the device A has the highest data sending priority among the three devices, in a bus use phase of the ith period, the device A sends data to the bus 200 and specifies a receiving device, and the device B and the device C are in a data receiving state or an idle state. In the (i+1)th period, it is assumed that the device B and the device C need to send data. In a competition phase of the (i+1)th period, the device B and the device C synchronously perform S102 by the foregoing communications method, that is, determine if the device has a highest data sending priority among the two devices (that is, the device B and the device C), and a result of the determining is yes or no. Assuming that the device B has the highest data sending priority between the two devices, in a bus use phase of the (i+1)th period, the device B sends data to the bus 200 and specifies a receiving device, and the device A and the device C are in a data receiving state or an idle state.

It should be noted that, the ith period and the (i+1)th period in FIG. 4 are shown by using an example in which at least some of devices in the communications system need to send data. In a communication period, if no device in the communications system needs to send data, the bus in the communication period is in an idle state, that is, no device in the communications system has the use right of the bus.

In view of the above, devices in the communications system may obtain a use right of the bus by competition, so that the devices can independently use the bus to transmit data. Further, because the devices in the communications system independently use the bus to transmit data without relying on the control by another device, the devices in the communications system update data in real time. In addition, a master device does not need to be set in the communications system, so that no device in the communications system needs to periodically control another device, thereby reducing control overheads of the device and improving device performance. In addition, a priority of sending data by each first candidate device is determined, so that a first candidate device with a highest priority currently obtains the use right of the bus in each communication period. In this way, it is ensured that communication between the devices in the communications system does not conflict, and communication reliability of the communications system is improved. In addition, real-time data update of a device with a high priority is also ensured.

In some exemplary embodiments, in the sending mode, the target device may send an end code to the bus at a target moment, to instruct at least one second candidate device to determine whether one of them has the highest data sending priority, where the at least one second candidate device includes at the target moment. The target moment may be an end moment of the first preset duration.

The example in FIG. 4 is used for description. In the bus use phase of the ith period, the device A sends the target data to the bus within the first preset duration and specifies the receiving device, and the device B and the device C are in the data receiving state or the idle state. At the end moment of the first preset duration, the device A may send the end code to the bus. After receiving the end code, the device B and the device C learn that the device A has released the use right of the bus 200, and learn that the device B and the device C enter the competition phase of the (i+1)th period. Therefore, the device B and the device C (that is, the at least one second candidate device) perform S102 by the foregoing communications method, that is, determine whether the device B and the device C have the highest data sending priority among the at least one second candidate device, to enable competition in the (i+1)th period.

The target device sends the end code to the bus at the end moment of the first preset duration, so that a communication period can be aligned among different devices in the communications system, and competition may be initiated among different devices at a same moment, thereby improving communication reliability of the communications system.

In some exemplary embodiments, the target moment may be alternatively earlier than the end moment of the first preset duration. That is, in the sending mode, the target device may alternatively send the end code to the bus before the first preset duration ends. For example, if the first preset duration does not end when the target device completes its sending of the target data, the end code may be sent to the bus, to instruct the at least one second candidate device to separately determine whether the at least one second candidate device has the highest sending priority among the at least one second candidate device, where the at least one second candidate device includes all devices to send data in the communications system at a sending moment of the end code.

If the target device completes its sending of the target data before the first preset duration ends, the end code is sent to the bus in advance. In this way, a communication period can be aligned among different devices in the communications system, and competition may be initiated among different devices at a same moment, thereby improving communication reliability of the communications system. In addition, inefficient occupation of the bus by the target device can be avoided, and the use right of the bus can be released in time for use by another device, thereby improving communication efficiency of the communications system.

In some exemplary embodiments, in S103, if the result of the determining is that the target device does not have the highest data sending priority, the target device executes the silent mode, and sets a state of the target device to a mute state. The mute state is a state in which data is forbidden to be sent to the bus, and the mute state may also be referred to as a disable state or a silent state. In the silent mode, the target device starts to receive data from the bus. After the data is received, it is determined, according to the identifier of the receiving device carried in the data, whether the data is sent to this device. If no, subsequent data may be ignored. If yes, the target device continues to receive subsequent data, and when the first preset duration ends, sets the state of the target device to a non-mute state. In this way, when generating new to-be-sent data, the target device may first determine whether the state of the target device is a mute state. If the target device is not in the mute state, S102 may be performed. If the target device is in the mute state it indicates that another device occupies the use right of the bus. In this case, the target device may first cache to-be-sent data, and then performs S102 after the state of the target device is switched to a non-mute state.

The example in FIG. 4 is used for description. In the competition phase of the ith period, the device A obtains the use right of the bus. Therefore, in the bus use phase of the ith period, the device A executes the sending mode, and the device B and the device C execute the silent mode, and set states of the device B and the device C to a mute state. In this period (that is, the bus use phase of the ith period), if the device B/device C generates to-be-sent data, because the device B/device C is in a mute state, the device B/device C first caches the to-be-sent data, instead of immediately performing S102 for competition. After the bus use phase of the ith period is completed (that is, after the device A releases the use right of the bus), both the device B and the device C are switched to a non-mute state. Further, the device B and the device C synchronously perform the foregoing S102, to compete for the use right of the bus.

In the foregoing communication process, a mute state and a non-mute state of a device are maintained, so that a communication period can be aligned among different devices in the communications system, and competition may be initiated among different devices at a same moment, thereby improving communication reliability of the communications system.

In some exemplary embodiments, after the target device accesses the bus 200, the foregoing S102 to S103 may be cyclically performed. For example, with reference to the example shown in FIG. 4, the foregoing S102 is performed in a competition phase of each period, and the foregoing S103 is performed in a bus use phase of each period.

In some exemplary embodiments, if the target device does not obtain the use right of the bus 200 within second preset duration, the priority of the target device is adjusted, and an adjusted priority is higher than the priority before the adjustment. The second preset duration is greater than the first preset duration. For example, with reference to the example shown in FIG. 4, the second preset duration may be a duration of three communication periods. That is, if the target device still does not obtain the use right of the bus 200 after waiting for three communication periods, the priority of the target device is increased. In this way, a probability that the target device obtains the use right of the bus by competition can be improved, to avoid a case that data of the target device cannot be sent for a long time. It should be understood that, when the priority is adjusted, the adjusted priority is different from a priority of another device in the communications system.

In some exemplary embodiments, each device in the communications system 001 corresponds to a feature code, and the feature code represents a priority of sending data by a corresponding device. In some exemplary embodiments, a quantity of bits included in the feature code is positively correlated with the priority. In this way, the quantity of bits included in the feature code may reflect a priority of sending data by the device. If the quantity of bits included in the feature code is larger, the priority of sending data by the device is higher. If the quantity of bits included in the feature code is smaller, the priority of sending data by the device is lower.

In some exemplary embodiments, the bus is at a first level in an idle state, and the feature code includes at least one second level that is consecutive in time, and a quantity of bits at the second level (that is, duration of the second level) is positively correlated with the priority.

In some exemplary embodiments, the first level is a high level, and the second level is a low level. In this case, a quantity of bits at the low level included in the feature code may reflect a priority of sending data by the device. If the quantity of bits at the low level included in the feature code is larger, duration of the low level on the bus is longer, and it indicates that the priority of sending data by the device is higher. If the quantity of bits at the low level included in the feature code is smaller, duration of the low level on the bus is shorter, and it indicates that the priority of sending data by the device is lower. In other words, for any two devices in the communications system, such as a first device and a second device, if a priority of sending data by the first device is higher than a priority of sending data by the second device, a quantity of bits at a low level included in a feature code of the first device (that is, a time in which the first device enables the bus to keep at the low level) is greater than a quantity of bits at a low level included in a feature code of the second device (that is, a time in which the second device enables the bus to keep at the low level).

In some exemplary embodiments, the first level is a low level, and the second level is a high level. In this case, a quantity of bits at the high level included in the feature code may reflect a priority of sending data by the device. If the quantity of bits at the high level included in the feature code is larger, the priority of sending data by the device is higher. If the quantity of bits at the high level included in the feature code is smaller, the priority of sending data by the device is lower. In other words, for any two devices in the communications system: a first device and a second device, if a priority of sending data by the first device is higher than a priority of sending data by the second device, a quantity of bits at a high level included in a feature code of the first device is greater than a quantity of bits at a high level included in a feature code of the second device.

In some exemplary embodiments, in addition to the at least one second level, the feature code of each device may further include a start code, where the start code is located before the at least one second level, and feature codes corresponding to different devices include a same start code. It can be understood that different devices in the communications system share a same start code. Therefore, when receiving data on the bus, a device in the communications system may identify, based on the start code, that current broadcast content is a feature code. In addition, when different devices synchronously broadcast feature codes, start locations of the 1st second level in different feature codes are aligned. It should be noted that content of the start code is not limited in this disclosure.

Figure 5:
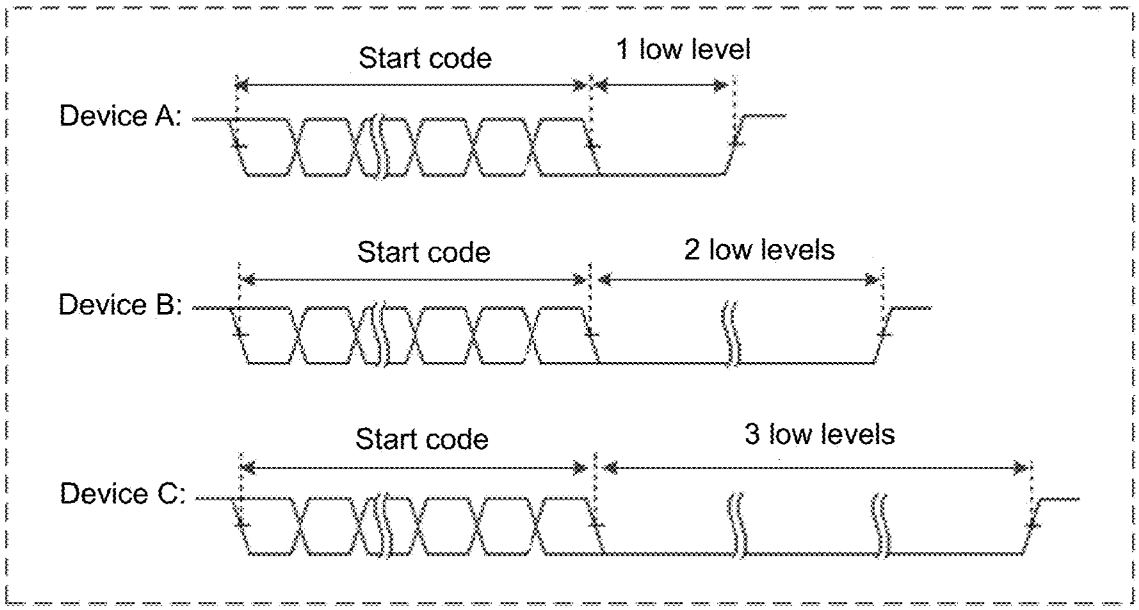
FIG. 5 is a schematic diagram of a feature code according to some exemplary embodiments of this disclosure.

In an example, FIG. 5 is a schematic diagram of a feature code according to some exemplary embodiments of this disclosure. As shown in FIG. 5, for example, the first level is a high level, and the second level is a low level. It is assumed that the communications system includes three devices: a device A, a device B, and a device C. A priority of sending data by the device A is high, a priority of sending data by the device B is medium, and a priority of sending data by the device C is low. Referring to FIG. 5, a feature code of the device A may include a start code and three low levels that are consecutive in time, a feature code of the device B may include a start code and two low levels that are consecutive in time, and a feature code of the device C may include a start code and one low level.

The foregoing feature code may represent the priority of sending data by the corresponding device. Therefore, a device in the communications system 001 may compete for the use right of the bus 200 by broadcasting a feature code of the device via the bus. In some exemplary embodiments, the target device may determine, in the following manner, whether the target device has the highest data sending priority among the at least one first candidate device:

(1) Broadcast a feature code of the target device to the bus, where when the target device broadcasts the feature code of the target device, another device of the at least one first candidate device also synchronously broadcasts a corresponding feature code.

That "another device of the at least one first candidate device also synchronously broadcasts a corresponding feature code" means that start moments at which the another device and the target device broadcast the respective feature codes are the same, that is, all first candidate devices start to broadcast feature codes among all the first candidate devices at a same moment.

(2) After broadcast of the feature code of the target device is completed, receive a next bit signal transmitted via the bus.

(3) Determine, according to the next bit signal, whether the target device has the highest data sending priority among the at least one first candidate device.

It should be understood that while broadcasting the feature code of the target device, the target device may receive a signal from the bus or may not receive a signal from the bus. If the signal is received from the bus, the signal received by the target device from the bus is the same as the feature code broadcast by the target device. After broadcast of the feature code of the target device is completed, the target device may receive the next bit signal transmitted via the bus, and further determine, based on the next bit signal, whether the target device has the highest data sending priority among the at least one first candidate device.

In some exemplary embodiments, the bus is at a high level in an idle state, and the feature code includes at least one low level. In this case, if the next bit signal received by the target device is at a low level, it indicates that another device in the communications system whose priority is higher than that of the target device is broadcasting a feature code to the bus. Therefore, the target device determines that the target device does not have the highest priority among the at least one candidate device. If the next bit signal received by the target device is at a high level, it indicates that no other device in the communications system is broadcasting a feature code to the bus. Therefore, the target device determines that the target device has the highest priority among the at least one candidate device.

In some exemplary embodiments, the bus is at a low level in an idle state, and the feature code includes at least one high level. In this case, if the next bit signal received by the target device is at a high level, it indicates that another device in the communications system whose priority is higher than that of the target device is broadcasting a feature code to the bus. Therefore, the target device determines that the target device does not have the highest priority among the at least one candidate device. If the next bit signal received by the target device is at a low level, it indicates that no other device in the communications system is broadcasting a feature code to the bus. Therefore, it is determined that the target device has the highest priority among the at least one candidate device.

For ease of understanding, the following describes the communications method of this disclosure by using examples with reference to FIG. 4 and FIG. 5.

It is assumed that the device A, the device B, and the device C all need to send data in the ith period. In the competition phase of the ith period, the device A, the device B, and the device C synchronously broadcast feature codes of the device A, the device B, and the device C, respectively. The feature codes broadcast by the device A, the device B, and the device C are shown in FIG. 5.

Since broadcast duration of the feature code of the device A is greater than broadcast duration of the feature code of the device B, and the broadcast duration of the feature code of the device B is greater than broadcast duration of the feature code of the device C, a broadcast completion moment of the feature code of the device A is later than a broadcast completion moment of the feature code of the device B, and the broadcast completion moment of the feature code of the device B is later than a broadcast completion moment of the feature code of the device C.

After broadcast of the feature code of the device C is completed, as broadcast of the feature codes of the device A and the device B is not completed, and the next bit signal received by the device C on the bus is at a low level, the device C determines that the device C does not have the highest priority among the foregoing three devices. Based on this, the device C learns that the device C does not obtain the use right of the bus, and thus executes the silent mode.

After broadcast of the feature code of the device B is completed, as broadcast of the feature code of the device A is not completed, and the next bit signal received by the device B on the bus is at a low level, the device B determines that the device B does not have the highest priority among the foregoing three devices. Based on this, the device B learns that the device B does not obtain the use right of the bus, and thus executes the silent mode.

After broadcast of the feature code of the device A is completed, as broadcast of feature codes of all devices is completed, the bus is in an idle state, and the next bit signal received by the device A on the bus is at a low level, the device A determines that the device A has the highest priority among the three devices. Based on this, the device A learns that the device A obtains the use right of the bus, and thus executes the sending mode.

After the foregoing competition phase, the device A obtains the use right of the bus. Therefore, in the bus use phase of the ith period (that is, within the first preset duration), the device A sends the target data to the bus and specifies the receiving device. The device B and the device C receive the target data from the bus, and if it is determined, after receiving the target data, that the target data is sent to the device B and the device C, the device B and the device C continue to receive subsequent data. If it is determined, after receiving the target data, that the target data is not sent to the device B and the device C, subsequent data may be ignored until the first preset duration ends.

A communication process in the (i+1)th period is similar to that in the ith period, and details are not described herein again.

It view of the above, according to the communications method, device, and system provided in this disclosure, any target device in a communications system has access to a single-wire serial bus; if the target device needs to send target data, it is determined whether the target device has a highest data sending priority among at least one first candidate device, where the at least one first candidate device includes all devices to send data in the communications system 001 at a current moment; and based on a result of the determining, the target device performs in a sending mode or a silent mode, where in the sending mode, the target device sends the target data to the bus and specifies a receiving device within a first preset duration, and stops sending the target data to the bus when the first preset duration ends, and in the silent mode, the target device is in a data receiving state or an idle state within the first preset duration. It can be learned that devices in the communications system may obtain a use right of the bus by competition, so that the devices can independently use the bus to transmit data. Further, because the devices in the communications system independently use the bus to transmit data without relying on the control by another device, the devices in the communications system update data in real time. In addition, a master device does not need to be set in the communications system, so that any device in the communications system does not need to periodically control another device, thereby reducing control overheads of the device and improving device performance. In addition, a priority of sending data by each first candidate device is determined, so that a first candidate device with a highest priority currently obtains the use right of the bus in each communication period. In this way, it is ensured that communication between the devices in the communications system does not conflict, and communication reliability of the communications system is improved. In addition, real-time data update of a device with a high priority is ensured.

Another aspect of this disclosure provides a non-transitory storage medium that stores at least one set of executable instructions for communication. When the executable instruction is executed by a processor, the executable instruction instructs the processor to implement the steps of the communications method P100 in this disclosure. In some exemplary embodiments, the aspects of this disclosure may further be implemented in a form of a program product, including program code. When the program product runs on the device 100, the program code is used to enable the device 100 to perform the steps of the communications method P100 in this disclosure. A program product for implementing the method according to the embodiments of the present disclosure may be in the form of a portable compact disk read-only memory (CD-ROM) and include program code, and may be run on the device 100. However, the program product of the present disclosure is not limited hereto. In the present disclosure, the computer-readable storage medium may be any tangible medium that contains or stores a program, and the program may be used by or in combination with an instruction execution system. The program product may be any combination of one or more readable media. The readable medium may be a readable signal medium or a readable storage medium. The readable storage medium, may be, for example, but not limited to, electrical, magnetic, optical, electromagnetic, infrared, or semiconductor systems, apparatuses, or devices, or any combination thereof. More specific examples of the readable storage medium include an electrical connection with one or more conducting wires, a portable computer disk, a hard disk, a random access memory (RAM), a read-only memory (ROM), an erasable programmable ROM (an EPROM or a flash memory), an optical fiber, a portable CD-ROM, an optical storage device, a magnetic storage device, or any suitable combination thereof. The computer-readable storage medium may include a data signal propagated in a baseband or as a part of a carrier, and readable program code is carried therein. The propagated data signal may be in various forms, including but not limited to an electromagnetic signal, an optical signal, or any suitable combination thereof. The computer-readable storage medium may alternatively be any readable medium other than the readable storage medium.

The readable medium may send, propagate, or transmit a program to be used by or in combination with the instruction execution system, apparatus, or device. The computer-readable storage medium contained on the readable medium may be transmitted using any suitable medium, including but not limited to: a wireless medium, a wired medium, an optical fiber, an RF, or any suitable combination thereof. Program code for executing the operations in the present disclosure may be compiled by using one or more programming languages or any combination thereof. The programming languages include object oriented programming languages, such as Java and C++, and conventional procedural programming languages, such as C or similar programming languages. The program code can be executed fully on the device 100, executed partially on the device 100, executed as an independent software package, executed partially on the device 100 and partially on a remote computing device, or executed fully on a remote computing device.

The foregoing describes the specific embodiments of the present disclosure. Other embodiments fall within the scope of the appended claims. In some cases, the actions or steps described in the claims may be performed in sequences different from those in the embodiments and may still achieve expected results. In addition, the processes depicted in the accompanying drawings do not necessarily require the specific orders or sequential orders shown for achieving the expected results. In some implementations, multitasking and parallel processing are also possible or may be advantageous.

In summary, after reading this detailed disclosure, a person skilled in the art can understand that the foregoing detailed disclosure may be presented by way of example only, and may not be limited. Although there is no clear description, a person skilled in the art can understand that this disclosure intends to cover various reasonable changes, improvements and modifications of the embodiments. These changes, improvements and modifications are intended to be proposed in this disclosure and are within the spirit and scope of the exemplary embodiments of this disclosure.

In addition, some specific terms in this disclosure have been used to describe the embodiments of this disclosure. For example, "one embodiment", "an embodiment" and/or "some exemplary embodiments" mean that a specific feature, structure, or characteristic described in combination with the embodiment may be included in at least one embodiment of the present disclosure. Therefore, it can be emphasized and should be understood that two or more references to "an embodiment" or "one embodiment" or "an alternative embodiment" in various parts of this disclosure do not necessarily all refer to the same embodiment. In addition, specific feature, structure, or characteristic may be appropriately combined in one or more embodiments of the present disclosure.

It should be understood that in the foregoing description of the embodiments of the present disclosure, to help understand a feature, and for the purpose of simplifying the present disclosure, the present disclosure sometimes combines various features in a single embodiment, a drawing, or description thereof. However, this does not mean that the combination of these features is necessary. It is entirely possible for a person skilled in the art to extract part of the device as a single embodiment for understanding when reading this disclosure. In other words, the embodiments in this disclosure can also be understood as an integration of multiple sub-embodiments. The content of each sub-embodiment is also true when it is less than all the characteristics of a single previously disclosed embodiment.

Each patent, patent disclosure, patent disclosure publication and other materials cited herein, such as articles, books, specifications, publications, documents, articles and the like, may be incorporated herein by reference. The entire content used for all purposes, except for any related litigation document history, may be inconsistent or conflicting with this document, or any identical litigation document that may have restrictive influence on the broadest scope of the claims' history. Those are associated with this document now or in the future. For example, if the description, definition, and/or use of terms in any associated materials contained herein is inconsistent with or in conflict with that in this document, the terms in this document shall prevail.

Finally, it should be understood that the embodiments of the disclosure disclosed herein is an explanation of the principle of the embodiment of the disclosure. Other modified embodiments are also within the scope of this disclosure. Therefore, the embodiments disclosed in this disclosure are merely examples rather than limitations. A person skilled in the art can adopt alternative configurations according to the embodiments of the present disclosure to implement the present disclosure. Therefore, the embodiments of the present disclosure are not limited to those explicitly described herein.

What is claimed is:

1. A communications method for a target device in a communications system with a single-wire serial bus, comprising:

accessing the single-wire serial bus in the communications system, wherein the communications system includes a plurality of devices connected via the single-wire serial bus, no master device is set in the communications system, and the plurality of devices is configured to obtain a use right of the single-wire serial bus by competition, and wherein each device in the communications system corresponds to a feature code, the feature code represents a priority of the device, the feature code includes at least one first level that is consecutive in time, and a quantity of bits at the first level is positively correlated with the priority, the quantity of bits at the first level representing a duration of the first level;

determining whether the target device has a highest data sending priority among at least one first candidate device, wherein the at least one first candidate device includes all devices to send data in the communications system at a current moment, wherein the determining whether the target device has a highest data sending priority among at least one first candidate device includes:

broadcasting the feature code of the target device to the single-wire serial bus, wherein when the target device broadcasts the feature code of the target device, another device of the at least one first candidate device synchronously broadcasts its feature code, after completion of broadcasting the feature code of the target device, receiving a next bit signal transmitted via the single-wire serial bus, and determining, based on whether the next bit signal is the first level or a second level, whether the target device has the highest data sending priority among the at least one first candidate device, wherein when the single-wire serial bus is in an idle state, the single-wire serial bus is at the second level; and executing, based on a result of the determining, a sending mode or a silent mode of the target device, wherein in the sending mode, the target device sends target data to the single-wire serial bus within a first preset duration and specifies a receiving device, and stops sending the target data to the bus the single-wire serial bus when the first preset duration ends, and in the silent mode, the target device is in a data receiving state or an idle state within the first preset duration.

2. The method according to claim 1, wherein the executing of the sending mode or the silent mode of the target device includes:

determining that the result of the determining is that the target device has the highest data sending priority; and executing the sending mode.

3. The method according to claim 1, wherein the executing of the sending mode or the silent mode of the target device includes:

determining that the result of the determining is that the target device does not have the highest data sending priority; and executing the silent mode.

4. The method according to claim 1, wherein in the sending mode, the target device sends an end code to the single-wire serial bus at a target moment, to instruct at least one second candidate device in the communications system to each determine whether the target device has the highest data sending priority among the at least one second candidate device, wherein the at least one second candidate device includes all devices to send data in the communications system at the target moment, wherein the target moment is an end moment of the first preset duration, or the target moment is earlier than the end moment of the first preset duration.

5. The method according to claim 1, wherein the feature code further includes a start code, and the start code is located before the at least one first level; and feature codes corresponding to different devices include a same start code.

6. The method according to claim 1, wherein the determining, based on whether the next bit signal is the first level or the second level, whether the target device has the highest data sending priority among the at least one first candidate device includes:

determining that the next bit signal is at the second level; and determining that the target device has the highest data sending priority among the at least one first candidate device.

7. The method according to claim 1, wherein the determining, based on whether the next bit signal is the first level or the second level, whether the target device has the highest data sending priority among the at least one first candidate device includes:

determining that the next bit signal is at the first level; and determining that the target device does not have the highest data sending priority among the at least one first candidate device.

8. The method according to claim 1, wherein the first level is a high level and the second level is a low level.

9. The method according to claim 1, wherein the first level is a low level and the second level is a high level.

10. The method according to claim 1, further comprising:

adjusting the priority of the target device if the target device does not obtain the use right of the single-wire serial bus within a second preset duration, wherein an adjusted priority is higher than the priority before the adjustment, and the second preset duration is greater than the first preset duration.

11. The method according to claim 1, wherein the priority corresponding to each device in the communications system is a preset fixed priority, and different devices correspond to different priorities.

12. The method according to claim 1, wherein the priority corresponding to each device in the communications system is related to data currently to be sent by the device.

13. The method according to claim 1, wherein the plurality of devices includes at least two of a headphone holder, a left headphone, and a right headphone.

14. A device for accessing a communications system with a single-wire serial bus, comprising:

at least one storage medium, storing at least one set of instructions and configured to communicate with another device; and at least one processor communicatively connected to the at least one storage medium, wherein during operation, the at least one processor executes the at least one set of instructions to cause the device to:

access the single-wire serial bus in the communications system, wherein the communications system includes a plurality of devices connected via the single-wire serial bus, no master device is set in the communications system, and the plurality of devices is configured to obtain a use right of the single-wire serial bus by competition, and wherein each device in the communications system corresponds to a feature code, the feature code represents a priority of the device, the feature code includes at least one first level that is consecutive in time, and a quantity of bits at the first level is positively correlated with the priority, the quantity of bits at the first level representing a duration of the first level, determine whether the target device has a highest data sending priority among at least one first candidate device, wherein the at least one first candidate device includes all devices to send data in the communications system at a current moment, wherein the determining whether the target device has a highest data sending priority among at least one first candidate device includes:

broadcasting the feature code of the target device to the single-wire serial bus, wherein when the target device broadcasts the feature code of the target device, another device of the at least one first candidate device synchronously broadcasts its feature code, after completion of broadcasting the feature code of the target device, receiving a next bit signal transmitted via the single-wire serial bus, and determining, based on whether the next bit signal is the first level or a second level, whether the target device has the highest data sending priority among the at least one first candidate device, wherein when the single-wire serial bus is in an idle state, the single-wire serial bus is at the second level; and execute, based on a result of the determining, a sending mode or a silent mode of the target device, wherein in the sending mode, the target device sends target data to the single-wire serial bus within a first preset duration and specifies a receiving device, and stops sending the target data to the single-wire serial bus when the first preset duration ends, and in the silent mode, the target device is in a data receiving state or an idle state within the first preset duration.

15. The device according to claim 14, wherein in the sending mode, the target device sends an end code to the single-wire serial bus at a target moment, to instruct at least one second candidate device in the communications system to each determine whether the target device has the highest data sending priority among the at least one second candidate device, wherein the at least one second candidate device includes all devices to send data in the communications system at the target moment, wherein the target moment is an end moment of the first preset duration, or the target moment is earlier than the end moment of the first preset duration.

16. The device according to claim 14, wherein the plurality of devices includes at least two of a headphone holder, a left headphone, and a right headphone.

17. A communications system, comprising:

a single-wire serial bus, and a plurality of devices connected to the single-wire serial bus, wherein no master device is set in the communications system, and the plurality of devices obtain a use right of the single-wire serial bus by competition, and when the communications system is in operation, a target device of the plurality of devices executes the following steps:

accessing the single-wire serial bus in the communications system, wherein the communications system includes a plurality of devices connected via the single-wire serial bus, no master device is set in the communications system, and the plurality of devices is configured to obtain a use right of the single-wire serial bus by competition, and wherein each device in the communications system corresponds to a feature code, the feature code represents a priority of the device, the feature code includes at least one first level that is consecutive in time, and a quantity of bits at the first level is positively correlated with the priority, the quantity of bits at the first level representing a duration of the first level;

determining whether the target device has a highest data sending priority among at least one first candidate device, wherein the at least one first candidate device includes all devices to send data in the communications system at a current moment, wherein the determining whether the target device has a highest data sending priority among at least one first candidate device includes:

broadcasting the feature code of the target device to the single-wire serial bus, wherein when the target device broadcasts the feature code of the target device, another device of the at least one first candidate device synchronously broadcasts its feature code, after completion of broadcasting the feature code of the target device, receiving a next bit signal transmitted via the single-wire serial bus, and determining, based on whether the next bit signal is the first level or a second level, whether the target device has the highest data sending priority among the at least one first candidate device, wherein when the single-wire serial bus is in an idle state, the single-wire serial bus is at the second level; and executing, based on a result of the determining, a sending mode or a silent mode of the target device, wherein in the sending mode, the target device sends target data to the bus the single-wire serial bus within a first preset duration and specifies a receiving device, and stops sending the target data to the single-wire serial bus when the first preset duration ends, and in the silent mode, the target device is in a data receiving state or an idle state within the first preset duration.

* * * * *